June 27, 1933.  J. L. ANDERSON  1,915,915
TORCH HOLDER FOR PORTABLE MACHINES
Filed Sept. 24, 1932  2 Sheets-Sheet 1
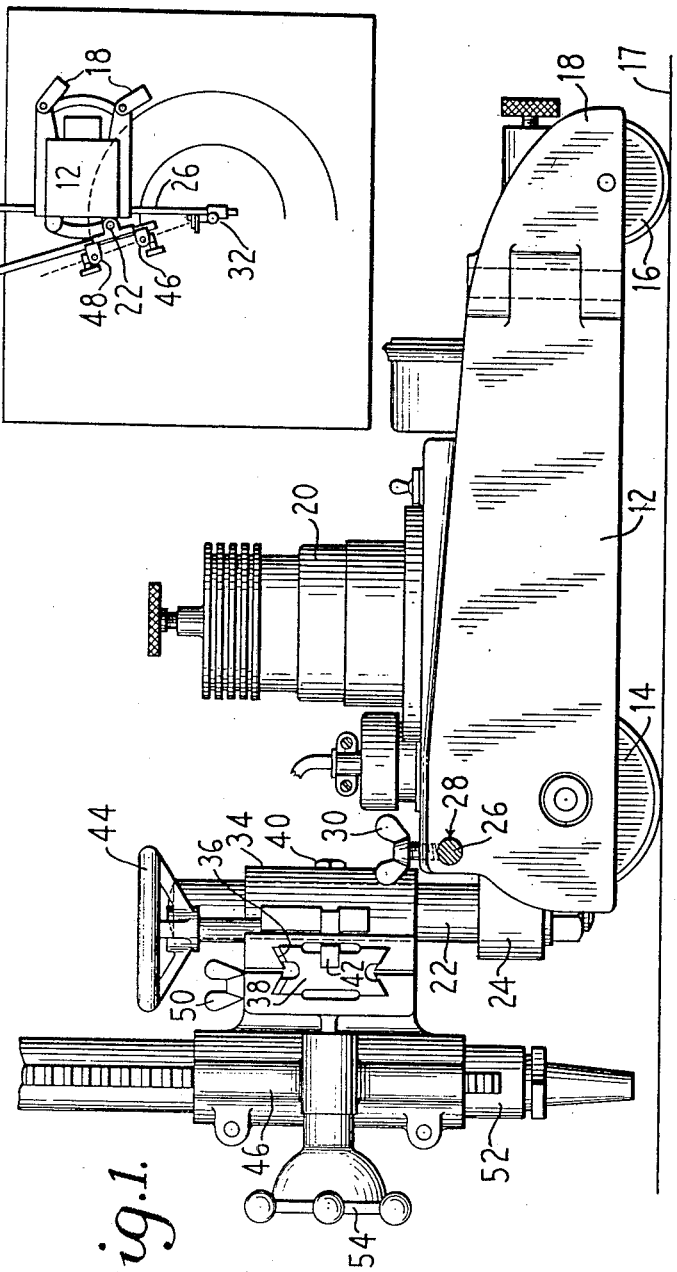
INVENTOR
James L. Anderson
BY
ATTORNEY June 27, 1933.  J. L. ANDERSON  1,915,915
TORCH HOLDER FOR PORTABLE MACHINES
Filed Sept. 24, 1932  2 Sheets-Sheet 2
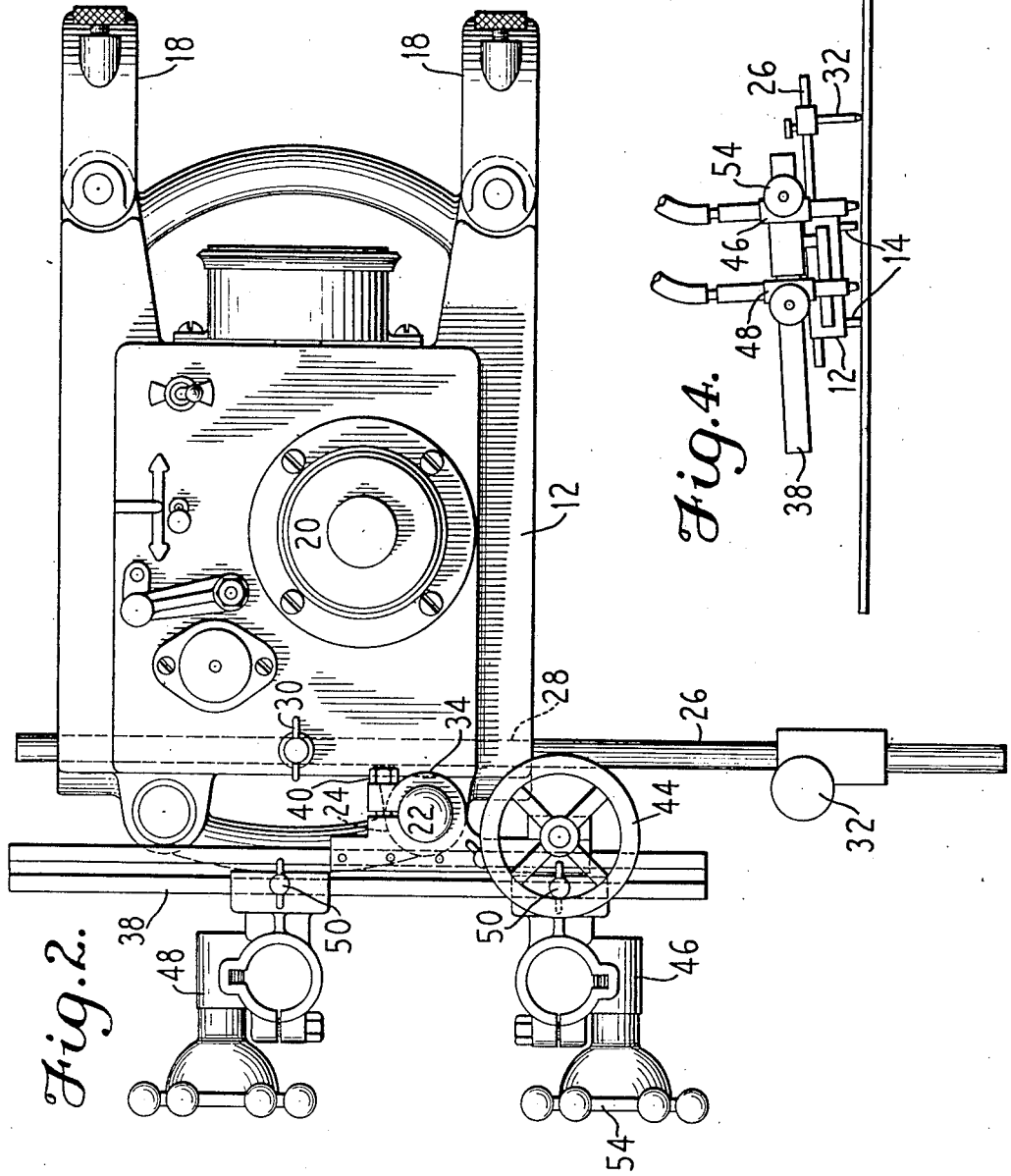
INVENTOR
James L. Anderson
BY
ATTORNEY Patented June 27, 1933

1,915,915

UNITED STATES PATENT OFFICE

JAMES L. ANDERSON, OF CLOSTER, NEW JERSEY, ASSIGNOR TO AIR REDUCTION COMPANY, INCORPORATED, OF NEW YORK, N. Y., A CORPORATION OF NEW YORK

TORCH HOLDER FOR PORTABLE MACHINES

Application filed September 24, 1932. Serial No. 634,668.

This invention relates to portable cutting or welding machines, and particularly to torch holders for such machines.

When operating on large pieces, it has become common practice in the cutting art to use a self-propelled wheeled carriage which runs on tracks or on the surface of the work and carries an oxygen cutting torch for operating on the work as the carriage travels. When cutting arcs and circles, the carriage is usually guided by a radius rod which is fastened to the carriage and has a center in contact with the work. The distance between the center and the carriage is adjustable to change the radius of the cut.

For many purposes it is desirable to cut two arcs or circles of different radii about the same center. In such cases much time can be saved by equipping the torch carriage with two torches, located at different distances from the center, for making simultaneous cuts while the carriage moves around the center.

The principal object of this invention is to provide an improved torch holder for holding two or more torches on a portable carriage in positions for making simultaneous cuts as the carriage moves over the surface of the work, and another object is to provide such a torch holder with means for adjusting the positions of the torches so that they are located on a common radius from a guiding center about which the carriage revolves, and can, therefore, be set conveniently, and with little likelihood of error, to make two cuts which are spaced a predetermined distance.

Another object of the invention is to provide a torch-holder having a bracket for connection with a wheeled carriage, and a supporting bar for two or more torches, the bar being movable to change the positions of the torches as a unit, and the torches being movable individually to change the spacing between the cuts.

Other objects, features and advantages of the invention will appear or be pointed out as the specification proceeds.

In the accompanying drawings, forming a part hereof:

Fig. 1 is a side elevation of a wheeled carriage with a torch holder made in accordance with this invention;

Fig. 2 is a top plan view of the machine shown in Fig. 1, with the torches removed;

Fig. 3 is a diagrammatic top plan view, on a reduced scale, showing the operation of the invention in making simultaneous cuts; and Fig. 4 is a diagrammatic front elevation of the machine shown in Fig. 3.

This invention is designed for use with a wheeled carriage having a body 12 supported on driving wheels 14 and caster wheels 16, which run on the surface of the work 17. The wheels 16 have their axles connected to wheel-carriers 18, which are swivelly connected with the carriage body 12. The driving wheels 14 are operatively connected with an electric motor 20. A post 22 is rigidly secured to a lug 24, which extends from the front of the body 12.

A radius rod 26 fits into a socket 28 in the carriage body 12, and is secured to the body by a set-screw 30. A center 32 is adjustable along the radius rod 26 and can be set at different positions, depending on the diameters of the circles or arcs to be cut. The apparatus thus far described is essentially the same as in my Patent No. 1,811,835, dated June 30, 1931.

The torch support comprises a split bracket 34, which has a transverse undercut guide slot 36, in which a supporting bar 38 is slidable. The split bracket 34 fits over the post 22 and is clamped to the post by a screw 40, which draws the split ends of the bracket together.

A rack 42 on the bar 38 engages a pinion operated by a hand wheel 44. This rack and pinion mechanism provides means for sliding the bar 38 in the bracket, the bar being ordinarily held against movement by friction.

Two torch holders 46 and 48 are carried by the bar 38 and are independently slidable along the bar so that the torches can be separated any desired distance within the limits of the bar length. Screws 50 clamp the respective torch holders in any set position along the bar 30. Each torch holder contains a torch 52, which can be moved in the holder by a hand-wheel 54 operating rack and pinion mechanism to raise and lower the torch with respect to the work 17.

Fig. 2 shows the torch holders with the torches removed. The hand-wheels for raising and lowering the torches are located on opposite sides of the torch holders, which are made as right- and left-hand members so that the torches can be brought very close together to make simultaneous cuts having radii which are very nearly equal. The invention is primarily intended for use with two torches, but contemplates the use of more than two torches in cases where three or more cutting operations are to be performed simultaneously about a common center.

Fig. 3 shows the torch support turned with respect to the carriage so that the torches are located on a common radius from the center 32. The distance between the torches is the same as the difference in the radii of the two cuts. This has the advantage of making the setting of the torches more convenient and less liable to error. If the torches were not located on a common radius rod and one torch were set by measurement from the center, and the other torch then set at a distance from the first torch equal to the difference in the radii of the arcs to be cut, the finished cuts would be closer than desired. This invention insures against such mistakes.

A change in the length of the radius rod between the carriage and the center 38 makes it necessary to change the position of the torch support to keep the torches on a common radius. The torch support is turned about the post 22, the screw 30 being released, if necessary, to reduce friction.

The invention provides all of the adjustments necessary for the most efficient operation of the machine to make two simultaneous cuts. The ends of the torch holders which slidably connect with the bar 38 provide means for changing the spacing of the torches along the bar 38, and the screws 50 provide means for locking the torch holders in any set positions. The torches can be moved as a unit, without changing their set spacing, by the hand-wheel 44. Although primarily useful for cutting operations, the invention can also be used for welding by substituting welding torches for the cutting torches described.

Fig. 4 shows the carriage operating about the center 32. The inside wheels are raised from the work 17 in the manner described in my aforesaid Patent 1,811,835. When the wheels on one side of the carriage are thus elevated, the carriage and bar 38 slope and it is necessary to operate the hand-wheel 54 to bring the torch into the proper position with respect to the surface of the work.

The principal advantages of the invention are in cutting or welding arcs and circles, but the invention can also be used for work in which the carriage is guided along a straight line or a non-circular curve.

The preferred embodiment of the invention has been described, but changes and modifications can be made without departing from the invention as defined in the appended claims.

I claim:

1. In a cutting or welding machine, a torch support comprising a bracket for connection with a carriage; a bar carried by the bracket and adjustable with respect to the bracket; a plurality of torch holders carried by the bar and individually movable along the bar to change their spacing relative to one another and to change their location with respect to the bracket.

2. A torch support for a cutting or welding machine comprising a supporting bar; a plurality of spaced torch holders carried by the bar; means for changing the spacing of the torch holders lengthwise of the bar; a bracket supporting the bar and adapted to be connected with a carriage; and means for moving the bar with respect to the bracket to change the positions of the torch holders as a unit without changing the spacing of the torch holders along the bar.

3. In a cutting or welding machine, a torch support comprising a bracket for connection with a carriage; a bar carried by the bracket; a plurality of spaced torch holders carried by the bar; means for changing the spacing of the torch holders lengthwise of the bar; a torch in each torch holder; means for moving each torch in its holder to adjust the torch with respect to the surface of the work; and means for moving the bar with respect to the bracket to change the positions of the torches as a unit.

4. A cutting or welding machine comprising a wheeled carriage; a radius rod connecting the carriage to a center about which the carriage moves; a torch support on the carriage; a plurality of spaced torches carried by the support; and means for moving the torch support to locate the torches on a common radius from the center.

5. The combination of a wheeled carriage; a bracket connected with the carriage; a bar supported by the bracket; means for moving the bar with respect to the bracket and the carriage; a plurality of torch holders slidably supported by the bar; and means for locking the respective torch holders in set positions on the bar.

6. In a cutting or welding machine, a torch support comprising a bracket clamp for connection with a wheeled carriage; a bar slidably held in the bracket; two torch holders carried by the bar and slidable lengthwise along the bar; and a clamp on each torch holder for locking it against sliding movement along the bar.

7. A cutting or welding machine including, in combination, a wheeled carriage; a bracket clamped to the carriage; a bar slidably held in the bracket; rack and pinion mechanism for sliding the bar with respect to the bracket; two torch holders carried by the bar and slidable lengthwise along the bar; and a clamp on each torch holder for securing it in set position on the bar; the bracket having a turning movement with respect to the carriage to turn the bar so that the torch holders are located on a common radius from a guide center about which the carriage moves.

8. A portable cutting or welding machine comprising a wheeled carriage; a supporting bar connected to the carriage; two torch holders carried by the bar and independently slidable along the bar to obtain the desired spacing between the torches; means for clamping the torch holders in set relation; a torch in each holder; and means on each holder for adjusting the torch in the holder, the adjusting means on each torch holder being located on the side of the holder opposite the other torch holder.

JAMES L. ANDERSON.